INVENTOR.
Uwe Klix
BY
ATTORNEY

United States Patent Office 3,355,633
Patented Nov. 28, 1967

3,355,633
CONTROLLABLE SUPPLY CIRCUIT FOR
ELECTROMAGNETIC VIBRATORS
Uwe Klix, Rottweil, Germany, assignor to Entwicklungsanstalt für Industrie-Elektronik, a corporation of Liechtenstein
Filed Dec. 28, 1964, Ser. No. 421,521
Claims priority, application Switzerland, Jan. 8, 1964, 180/64
10 Claims. (Cl. 317—148.5)

The present invention has reference to an improved controllable supply circuit for electromagnetic vibrators.

Electromagnetic vibrators as such have found application for the drive of conveyor troughs, dosing units, charging devices and so forth, are supplied by an alternating-current network through the intermediary of a half-wave rectifier. Previously, potentiometers, regulating transformers, thyratrons, magnetic amplifiers, among others, were employed as the control element for most of the required stepless power regulation between null and maximum power or load. Controlling devices of this type are rather expensive, need a great deal of space, oftentimes more than the vibrator itself. In the case of potentiometers or series resistance considerable energy is transformed into heat at such potentiometers or series resistance with lower vibrator power. On the other hand, when using thyratrons or magnetic amplifiers the relatively high voltage drop of 15 volts to 30 volts even with full power control is a disadvantage.

New possibilities have arisen with the advent of controlled semiconductor rectifiers in which the functions of the controlling element and the rectifier have been combined. Its small dimensions, readiness for immediate operation and its low voltage drop permit it to be suitably employed to a considerable extent with electromagnetic vibrators. Generally speaking, in this environment the rectifier is connected in series with the vibrator coil, power regulation occurring through circuit impulses (starting impulses) applied to the control electrode of the rectifier. Such impulses are synchronized with the frequency of the network, however, are changeable with regard to phase position (power control by controlling point of ignition of controlled rectifier). However, a number of different difficulties arise during practical application which, up to the present, have not been able to be completely overcome.

Above all, the controlled or controllable semiconductor rectifier is endangered by excessive voltages occurring during operation. On the one hand, short excessive peak voltages are oftentimes superimposed upon the supply network. They are brought about by switching-in transformers, motors, compensating capacitors and so forth. However, in the circuit itself excessive peak voltages are also produced which are governed by the particular characteristics of the controlled rectifier in conjunction with the inductivity of the vibrator coil. After the rectifier has been placed each time by means of a starting impulse applied to the control electrode during each cycle into a conducting state it does not return to the blocking or non-conducting condition with the next zero crossover, rather upon falling below a finite forward current, the so-called holding current. Due to this current the vibrator coil is switched-off during each cycle. Tripping back of the rectifier takes place within a few microseconds, and even though the holding current only amounts to approximately 0.05 to 0.1 amperes there appear considerable excessive peak voltages which influence the rectifier in the blocking or high-resistance direction.

Consequently, during periodic switching-in of the controlled rectifier difficulties arise by virtue of the high inductivity of the vibrator coil. Beginning with the starting impulse the current climbs only in accordance with the time-constant L/R of the current circuit. Whenever the value of the mentioned holding current has still not been reached after disappearance of the starting impulse, then the rectifier immediately trips back again into the non-conducting or blocked condition. Ignition and as a result an appreciable current flow through the vibrator then does not occur at all.

Both of the described shortcomings can initially be overcome in that, the controlled semiconductor rectifier is bridged by a capacitor. Short excessive peak voltages which are superimposed on the network or appear at the vibrator coil are removed via this parallelly connected capacitance, so that they do not endanger the semiconductor rectifier. Furthermore, after each starting impulse the capacitor immediately delivers a sufficient current through the controlled rectifier, so that the immediate tripping back into the blocking condition is prevented.

The aforementioned measure of connecting a capacitor in parallel with the controlled semiconductor rectifier, however, at the same time brings about a new undesired phenomenon: The vibrator coil and the capacitor form a series resonant circuit which with a relatively loss free construction of the vibrator (quality of the sheet metal or iron) can exhibit a considerable quality factor. Each time during tripping back of the controlled rectifier into the blocking state this oscillatory or resonant circuit is placed into resonance vibration. By virtue of the resonance rise dangerous excessive voltages again appear at the capacitor and, thus, at the controlled rectifier. As a result, the intended protective action of the capacitor is rendered questionable.

Thus, the present invention has as one of its prime objects to design an improved supply circuit for electromagnetic vibrators which completely overcomes the previously mentioned difficulties.

In order to implement this and other objects of the invention there is provided a supply circuit in which a controlled semiconductor rectifier is coupled in series with the vibrator coil. A current circuit incorporating a capacitor is connected in parallel with the aforesaid semiconductor rectifier. Characteristic of the inventive supply circuit is that a semiconductor diode with the same conducting direction as the controlled rectifier is connected between such controlled rectifier and the vibrator coil, such diode either exhibiting breakdown characteristics or being bridged by a voltage-limiting current branch.

Other features, objects and advantages of the invention will become apparent by reference to the following detailed description and drawing in which.

Figure 1:
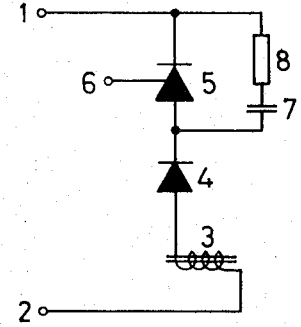
FIGURE 1 is a circuit diagram illustrating a basic construction of the inventive supply circuit.

Describing now the drawing, it will be understood that the basic circuit of FIGURE 1 is connected between the terminals 1 and 2 of an alternating-current supply network. A controlled semiconductor rectifier 5 serving as control element for load regulation or power control of the vibrator drive is connected in series with the vibrator coil 3. In known manner a non-illustrated impulse source is connected to the control electrode 6 of the semiconductor rectifier 5, the impulses being synchronized with the frequency of the supply network, yet are adjustable in phase relation. These impulses bring about periodic starting or ignition of the rectifier 5 which again trips back into its blocking state upon subsequently falling below its holding current. In this way power or energy flowing through the vibrator coil 3 is regulated in the manner of controlling the ignition point of the controlled rectifier by changing the phase relationship of the starting impulse at the control electrode 6.

A current branch containing a capacitor 7 and a current-limiting resistor 8 is connected in parallel with the controlled semiconductor rectifier 5. This current branch circuit has the purpose of short-circuiting excessive peak voltages occurring in the supply network or at the vibrator coil 3 and keeping such away from the controlled rectifier 5. Additionally, the charge of the capacitor 7 results in a sufficient flow of current through the rectifier 5 immediately after disappearance of the short starting impulse at the control electrode 6, in order to hold the rectifier 5 in conducting state until the current through the vibrator coil 3 (the inductivity of which delays the increase of current) exceeds the holding current of the controlled semiconductor rectifier 5.

A semiconductor diode 4 with the same conducting direction as the controlled rectifier 5 is electrically coupled between the vibrator coil 3 and the aforesaid controlled rectifier 5. This diode 4 has the function of preventing triggering of a series resonance circuit formed by the vibrator coil 3 and the capacitor 7 each time when the controlled rectifier 5 returns into the blocking state. Without such a diode 4 periodic voltage peaks would appear at the capacitor 7 due to a resonant oscillation between coil 3 and capacitor 7, which could destroy the controlled semiconductor rectifier 5.

However, the semiconductor diode 4 in turn is subjected to excessive voltages occurring in the circuit, for which reason special precautions must be undertaken for its protection. One possibility resides in employing a diode possessing avalanche or breakdown characteristic of the type exhibited by Zener diodes or Avalanche diodes. Such "self-protecting" semi-conductor diodes are extensively insensitive to excessive voltages in the blocking range by virtue of their particular characteristics.

Figure 2:
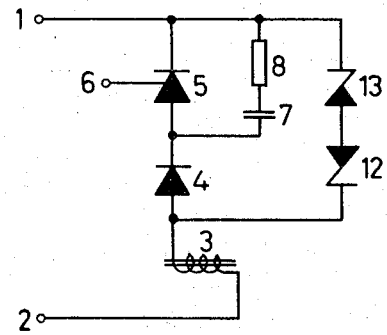
FIGURE 2 illustrates a circuit provided with a special voltage-limiting current branch.

Moreover, instead of a special diode, as mentioned, it is also possible to employ a standard semiconductor diode 4 which is bridged by a voltage-limiting current branch circuit in order to protect such against damaging excessive voltages. This possibility is depicted in the circuit of FIGURE 2. It will be understood that this circuit basically incorporates the same circuit components as in FIGURE 1, like reference numerals again being employed for the same elements, with the difference that, in this case, a conventional semiconductor diode 4 is employed. In order to protect such against excessive voltages there is, however, provided an additional current branch circuit, which extends from the point of connection or junction between the semiconductor diode 4 and vibrator coil 3 towards the connection of the controlled semiconductor rectifier 5 at the side of the power network. This additional current branch circuit contains two semiconductor diodes 12 and 13 connected in opposition and possessing avalanche or breakdown characteristics. Regarding these diodes 12, 13 there can here again be used Zener diodes or Avalanche diodes, or those commercially available semiconductor diodes sold under the trademark "TYRECTOR." With the selection of the types of diodes 12 and 13 having suitable breakdown or avalanche voltage the voltage through this current branch circuit and thereby through the controlled semiconductor rectifier 5 and the diode 4 is limited to a value which cannot become dangerous for both of the last-mentioned circuit components.

Figure 3:
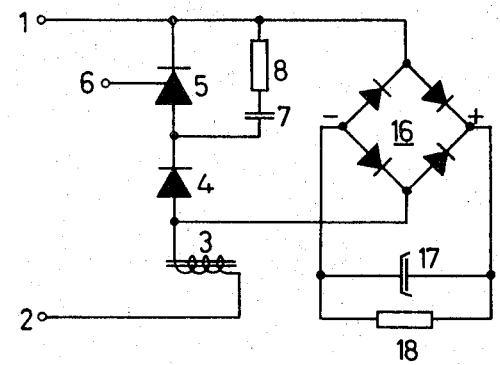
FIGURE 3 depicts a variant circuit incorporating a particularly favorable construction of the voltage-limiting current branch.

The mentioned special diodes 12 and 13 are relatively expensive. Additionally, their dimensioning with regard to the breakdown voltage is critical to some extent, since with the usually small increase of the network voltage the diodes should still be non-conductive or block. In consideration thereof, the variant circuit of FIGURE 3 is particularly advantageous. This circuit differs from that of FIGURE 2 by the provision of a different type of voltage-limiting current branch circuit. In this case, the current branch circuit contains a full-wave rectifier bridge 16. A capacitor 17 of relatively large capacitance is connected to the direct-current side of the rectifier arrangement or bridge 16. This capacitor 17 is shunted or bridged by a discharge resistor 18. During operation the capacitor 17 is charged to the network peak voltage via the full-wave rectifier bridge 16. Upon the appearance of an excessive peak voltage a corresponding considerable charging current flows in the capacitor 17, whereby, however, during the short duration of the voltage peak the capacitor voltage only increases an amount which is not critical due to the large capacitance of the aforesaid capacitor 17. After the decay of the excessive voltage the capacitor 17 discharges through the leakage resistor 18 again to the network peak voltage. The voltage of the capacitor 17 automatically adjusts to the usual, relatively slow fluctuations of the network voltage. This protective circuit responds particularly favorably against cut-in or starting surges during placing the system into operation, since then the capacitor 17 is initially completely discharged.

The voltage-limiting current circuit depicted in FIGURE 3 embodies only conventional, commercially available and, therefore, inexpensive circuit components, the dimensions of which are not critical.

While there is shown and described present preferred embodiments of the invention it is to be distinctly understood that the invention is not limited thereto but may be otherwise variously embodied and practiced within the scope of the following claims.

What is claimed is:

1. Controllable supply circuit for electromagnetic vibrators comprising a vibrator coil, a controlled semiconductor rectifier connected in series with said vibrator coil, a current branch circuit including a capacitor connected in parallel with said controlled semiconductor rectifier, a semiconductor diode having the same conducting direction as said controlled semiconductor rectifier connected between the latter and said vibrator coil.

2. Controllable supply circuit for electromagnetic vibrators as defined in claim 1 wherein said semiconductor diode possesses breakdown characteristics.

3. Controllable supply circuit for electromagnetic vibrators as defined in claim 1 wherein said semiconductor diode is a Zener-diode.

4. Controllable supply circuit for electromagnetic vibrators as defined in claim 1 wherein said semiconductor diode is an Avalanche-diode.

5. Controllable supply circuit for electromagnetic vibrators as defined in claim 1 further including a voltage-limiting current branch circuit bridging said semiconductor diode.

6. Controllable supply circuit for electromagnetic vibrators as defined in claim 5 wherein said voltage-limiting current branch circuit, on the one hand, is coupled between the junction of said semiconductor diode and said vibrator coil and, on the other hand, is coupled with a connection of said controlled semiconductor rectifier to a power network.

7. Controllable supply circuit for electromagnetic vibrators as defined in claim 5 wherein said voltage-limiting current branch circuit contains two diodes connected in opposition with respect to one another.

8. Controllable supply circuit for electromagnetic vibrators as defined in claim 7 wherein said two diodes are Zener-diodes.

9. Controllable supply circuit for electromagnetic vibrators as defined in claim 7 wherein said two diodes are Avalanche-diodes.

10. Controllable supply circuit for electromagnetic vibrators as defined in claim 5 wherein said voltage-limiting current branch circuit contains a full-wave rectifier bridge, a capacitor connected to the direct-current side of said full-wave rectifier bridge, and a discharge resistor bridging said capacitor.

References Cited

UNITED STATES PATENTS

| | | | |
|---|---|---|---|
| 3,172,019 | 3/1965 | Ragonese | 317—148.5 |
| 3,241,779 | 3/1966 | Bray et al. | 317—148.5 |
| 3,296,498 | 1/1967 | Chassanoff et al. | 317—123 |
| 3,316,470 | 4/1967 | Scott | 318—130 |

MILTON O. HIRSHFIELD, *Primary Examiner.*

L. T. HIX, *Examiner.*